(12) United States Patent
Dorini (10) Patent No.: US 12,086,966 B2
(45) Date of Patent: Sep. 10, 2024

(54) METHOD, CONTROLLER AND APPARATUS FOR CORRECTING THERMAL IMAGES

(71) Applicant: Stratasys Powder Production Ltd., London (GB)

(72) Inventor: Gianluca Dorini, London (GB)

(73) Assignee: Stratasys Powder Production Ltd., London (GB)

( * ) Notice: Subject to any disclaimer, the term of this patent is extended or adjusted under 35 U.S.C. 154(b) by 356 days.

(21) Appl. No.: 17/741,984

(22) Filed: May 11, 2022

(65) Prior Publication Data

US 2022/0383460 A1    Dec. 1, 2022

(30) Foreign Application Priority Data

Jun. 1, 2021   (GB) ...................................... 2107789

(51) Int. Cl.
| | |
|---|---|
| *G06T 5/80* | (2024.01) |
| *G01J 5/00* | (2022.01) |
| *G01J 5/80* | (2022.01) |

(52) U.S. Cl.
CPC .............. *G06T 5/80* (2024.01); *G01J 5/0066* (2013.01); *G01J 5/80* (2022.01); *G01J 2005/0077* (2013.01); *G06T 2207/10048* (2013.01)

(58) Field of Classification Search
CPC ......... B33Y 10/00; B33Y 30/00; B33Y 50/02; B29C 64/393
See application file for complete search history.

(56) References Cited

U.S. PATENT DOCUMENTS

| | | |
|---|---|---|
| 2016/0224017 A1 | 8/2016 | Huang et al. |
| 2019/0113398 A1* | 4/2019 | Comas ...................... G01J 5/53 |

(Continued)

FOREIGN PATENT DOCUMENTS

| | | |
|---|---|---|
| CN | 104353843 A | 2/2015 |
| KR | 102256181 B1 | 5/2021 |

(Continued)

OTHER PUBLICATIONS

United Kingdom Search Report for Application No. GB2107789.6, dated Nov. 12, 2021.

*Primary Examiner* — Benjamin O Dulaney
(74) *Attorney, Agent, or Firm* — Honigman LLP; Eric J. Sosenko; Jonathan P. O'Brien (57) ABSTRACT

A method for correcting thermal image distortion in a thermal camera in an apparatus for the layer-by-layer manufacture of three-dimensional objects, the thermal camera comprising a plurality of sensor pixels arranged along a first direction; the method comprising the steps of: (a) causing a temperature reference to be at a first steady state temperature; (b) moving the temperature reference at the first steady state temperature through a plurality of positions along the first direction through the field of view of the thermal camera; (c) recording a plurality of thermal images with the thermal camera while moving the temperature reference during step (b), each thermal image corresponding to one of the plurality of positions and comprising the detected temperature of the temperature reference as detected by at least one pixel of the plurality of sensor pixels; (d) identifying the at least one pixel that detected the temperature of the temperature reference within a respective thermal image at the corresponding one of the plurality of positions; (e) constructing a thermal map from the identified pixels representing the detected temperature of the temperature reference at the plurality of positions; (f) generating a correction (Continued)

matrix for the identified pixels based on comparison between the thermal map and the first steady state temperature; and (g) applying the correction matrix to subsequent measurements of the thermal camera. A controller and an apparatus for the layer-by-layer manufacture of three-dimensional objects comprising the controller to carry out the method are also provided.

20 Claims, 9 Drawing Sheets

(56) References Cited

U.S. PATENT DOCUMENTS

| | | |
|---|---|---|
| 2019/0291184 A1 | 9/2019 | Buller et al. |
| 2020/0200608 A1 | 6/2020 | Williams et al. |
| 2021/0201472 A1* | 7/2021 | Sohn ................... G06V 10/82 |
| 2021/0221060 A1* | 7/2021 | Lee ...................... B22F 12/90 |
| 2021/0331410 A1* | 10/2021 | Barnes ................ B29C 64/295 |
| 2022/0203624 A1* | 6/2022 | Garcia Grau .......... B22F 12/17 |
| 2022/0227059 A1* | 7/2022 | Borras Camarasa .. B33Y 50/02 |
| 2022/0324026 A1* | 10/2022 | Beckett ................ B33Y 50/02 |

FOREIGN PATENT DOCUMENTS

| | | |
|---|---|---|
| WO | 2019/103218 A1 | 5/2019 |
| WO | 2021/021118 A1 | 2/2021 |

\* cited by examiner

METHOD, CONTROLLER AND APPARATUS FOR CORRECTING THERMAL IMAGES

FIELD OF THE INVENTION

The present invention relates to a method, controller and apparatus for correcting for thermal vignetting distortions in images of a thermal camera. The methods may find specific application in apparatus for the layer-by-layer manufacturing of three-dimensional objects from powder where such a camera is used to monitor the temperature of the powder layer.

BACKGROUND

The present disclosure is concerned with thermal control in apparatus in which a thermal camera is used to monitor the temperature of a surface, and which is used to feed back information to a controller of a heater, for example, to compensate for temperature deviations from a desired temperature profile across the surface. An example for such an apparatus is a powder bed fusion type apparatus in which an object is formed layer-by-layer from powder using a heat source to fuse the powder to form successive cross sections of the object. In such apparatus, an infrared heat source may be used in combination with infrared radiation absorber applied selectively to areas of powder representing the cross section of the object. Alternatively, a laser may selectively heat the areas representing the cross section of the object. In powder bed fusion apparatus, excessive temperature differentials across the layer surface can lead to warping of the fused areas, which in turn leads to poor object quality and, at worst, to failure of the build process. Therefore, the apparatus usually comprises one or more heaters to maintain the layer surface within a certain temperature range, and a thermal camera. The thermal camera is used to monitor the temperature of the surface of each layer and provides thermal information of the surface that is used to control the heater to compensate for fluctuations in surface temperature of the layer. It is thus important that the thermal images of the camera are representative of the true temperature profile of the layer surface at any time during the process.

Thermal cameras are subject to image distortion due to thermal vignetting, which leads to an artificial non-flat profile in the temperature map of a surface when it is, in reality, thermally uniform. Typical image distortions of a thermally uniform surface due to thermal vignetting effects result in an image showing a perceived hotter centre and a cooler boundary. In a powder bed fusion apparatus this can significantly compromise control over process temperature, particularly near the layer surface boundary where temperatures will appear artificially depressed due to thermal vignetting.

A thermal camera may be calibrated for thermal vignetting effects outside of the apparatus in which it is to be installed. However, any shift in camera position due to servicing of the apparatus for example will likely require recalibration. In addition, calibration should be carried out specific to the distance between the thermal camera and the imaged surface.

Therefore, an in-situ method for determining a correction for thermal vignetting effects is desirable that may be carried out at any time as necessary with minimal operator intervention and minimal impact on the throughput of object builds.

SUMMARY

The following disclosure describes, in one aspect, a method for correcting thermal image distortion in a thermal camera in an apparatus for the layer-by-layer manufacture of three-dimensional objects, the thermal camera comprising a plurality of sensor pixels arranged along a first direction; the method comprising the steps of: (a) causing a temperature reference to be at a first steady state temperature; (b) moving the temperature reference at the first steady state temperature through a plurality of positions along the first direction through the field of view of the thermal camera; (c) recording a plurality of thermal images with the thermal camera while moving the temperature reference during step (b), each thermal image corresponding to one of the plurality of positions and comprising the detected temperature of the temperature reference as detected by at least one pixel of the plurality of sensor pixels; (d) identifying the at least one pixel that detected the temperature of the temperature reference within a respective thermal image at the corresponding one of the plurality of positions; (e) constructing a thermal map from the identified pixels representing the detected temperature of the temperature reference at the plurality of positions; (f) generating a correction matrix for the identified pixels based on comparison between the thermal map and the first steady state temperature; and (g) applying the correction matrix to subsequent measurements of the thermal camera.

In a second aspect, a controller for correcting thermal image distortion of a thermal camera in an apparatus for the layer-by-layer manufacture of three-dimensional objects is provided, the thermal camera comprising a plurality of sensor pixels arranged along a first direction, wherein the controller is configured to: (a) cause a temperature reference to be at a first steady state temperature; (b) control movement of the temperature reference at the first steady state temperature to move the temperature reference through a plurality of positions along the first direction through the field of view of the thermal camera; (c) control the thermal camera during step (b) to record a plurality of thermal images, each thermal image corresponding to one of the plurality of positions and comprising the temperature of the temperature reference as detected by at least one pixel of the plurality of pixels; (d) identify the at least one pixel that detected the temperature of the temperature reference within the respective thermal image at the corresponding one of the plurality of positions within the image; (e) construct a thermal map from the identified pixels representing the detected temperature of the temperature reference at the plurality of positions; (f) generate a correction matrix for the identified pixels based on a comparison between the thermal map and the first steady state temperature; and (g) apply the correction matrix to subsequent measurements of the thermal camera.

In a third aspect, an apparatus for the layer-by-layer formation of a three-dimensional object from particulate material is provided, the apparatus comprising: a thermal camera provided above a support for a layer over which a cross section of the object is to be formed, the thermal camera comprising a plurality of sensor pixels arranged along a first direction and configured to monitor the temperature of the layer surface; a temperature reference moveable through a plurality of positions along the first direction across the support and through the field of view of the thermal camera, wherein the thermal camera is further configured to detect the temperature of the temperature reference; and a controller configured to: (a) cause a temperature reference to be at a first steady state temperature; (b) control the movement of the temperature reference at the first steady state temperature so as to move the temperature reference through a plurality of positions along a first direction through the field of view of the thermal camera; (c) control the thermal camera during step (b) to record a plurality of thermal images, each thermal image corresponding to one of the plurality of positions and comprising the temperature of the temperature reference as detected by at least one pixel of the plurality of sensor pixels; (d) identify at least one pixel that detected the temperature of the temperature reference within a respective thermal image at the corresponding one of the plurality of positions; (e) construct a thermal map from the identified pixels representing the detected temperature of the temperature reference at the plurality of positions; (f) generate a correction matrix for the identified pixels based on comparison between the thermal map and the first steady state temperature; and (g) apply the correction matrix to subsequent measurements of the thermal camera.

Aspects of the invention are set out in the appended independent claims, while particular variants of the invention are set out in the appended dependent claims.

BRIEF DESCRIPTION OF THE DRAWINGS

Reference is now directed to the drawings, in which.

In the Figures, like elements are indicated by like reference numerals throughout.

DETAILED DESCRIPTION

An embodiment of the invention and its variants will now be described with reference to FIGS. 1 to 9B. Powder-bed fusion based apparatus for the manufacture of three-dimensional objects typically comprises an infrared heat source, such as an elongate bar heater, that spans the width of the layer surface and that is arranged to be moveable back and forth along the length of the layer surface to pre-heat the powder layer and/or to fuse regions of powder of the layer surface. Furthermore, a thermal camera may be present that is used to monitor the temperature of the layer surface during the process of building the object. Such a thermal camera may be mounted above the layer surface to monitor the entire layer surface during a build process.

The overall temperature of the layer surface may be controlled layer by layer based on feedback of thermal measurements of the layer surface during each layer processing sequence using the thermal camera. Accurate measurement of layer surface temperature is necessary to allow adequately accurate control of the layer surface temperature during the build process across the entire layer surface so as to achieve good part quality at any location of the build bed. The accuracy of the thermal images may be improved significantly by reducing or substantially removing thermal vignetting effects. To assess thermal vignetting, a surface of a uniform temperature is conventionally provided to be imaged by the thermal camera. A method to correct for thermal vignetting in-situ of the apparatus has been developed according to the present disclosure that makes use of the presence of a moveable and preferably elongate temperature reference within the apparatus, such as the infrared heat source typically present in a print and fuse type powder bed fusion apparatus. In this way, thermal vignetting may be corrected with specific focus on the typical temperature ranges applied within the apparatus and the distance between the camera sensor and the layer surface, and without the need of a large area temperature reference.

Figure 1:
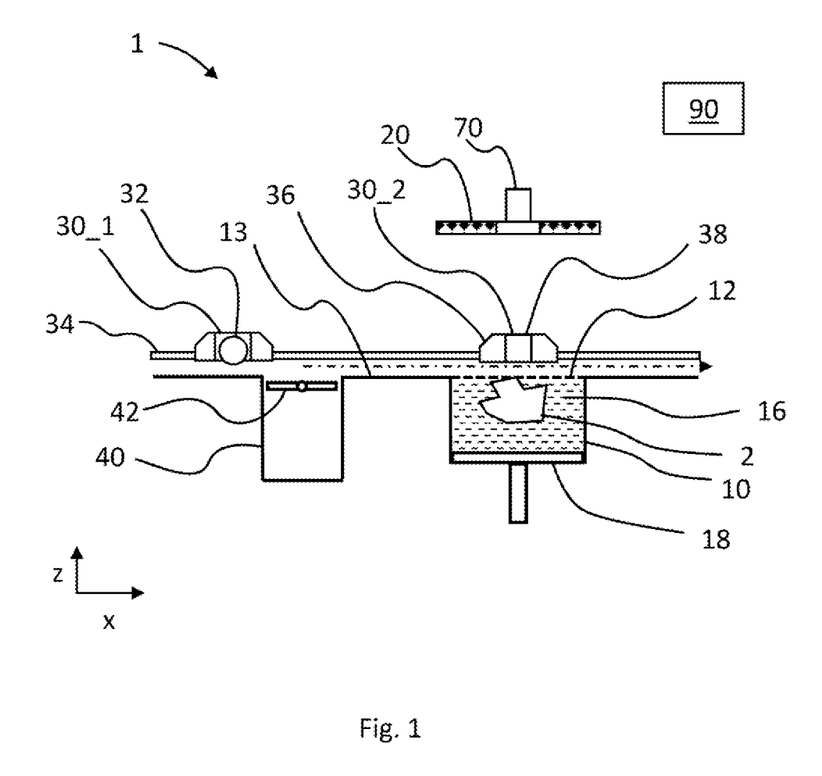
FIG. 1 is a schematic cross-section of an apparatus for the layer-by-layer manufacturing of three-dimensional objects from powder for carrying out the methods according to an embodiment and as applied by a controller 90.

The method, controller and example apparatus will now be described in relation to a "print and fuse" type powder bed fusion apparatus, shown in cross section schematically in FIG. 1. The apparatus 1 comprises a thermal camera 70 mounted above a build bed 16 containing the portion of the object 2 that has been built. With powder bed fusion, the object is supported by unfused powder within the build bed 16. The build bed is supported on a platform 18 vertically moveable within container walls 10. Before a fresh layer is formed, the platform 18 is lowered by a layer thickness. Powder is delivered from a powder reservoir (not shown) using a dosing blade 42 of a dosing system 40 to a work surface 13 comprising the top of the build bed 16. A fresh layer of powder is distributed over the build bed by a distributor module 32 mounted on a first carriage 30_1 (here indicated as a roller module) to form a new build bed surface 12 (herein referred to as layer surface 12) over which the next cross section of the object is to be formed.

Next, a printing module 38 is moved over the layer surface 12 to selectively deposit radiation modifying fluid, such as radiation absorbing fluid containing carbon black, over specific areas on the layer surface that correspond to the cross section of the object 2. In this example apparatus, the printing module 38 is provided on a second carriage 30_2 moveable along the same direction as the first carriage 30_1; for example both carriages may be mounted on common rail system 34. Finally, a heat source is passed over the printed areas to fuse the areas printed with fluid. In FIG. 1, this may be a heat source provided on the second carriage 30_2.

During processing, an overhead heater 20 comprising individual heater elements may be operated to maintain the temperature of the unfused areas of the layer surface at a uniform profile at a predefined temperature set point. This set point may be 10-15° C. below the melting temperature of the powder. To achieve a suitable level of control, the overhead heater may be operated based on feedback from the thermal camera 70 using controller 90. Thermal images taken by the thermal camera 70 are processed to determine deviations from the set point temperature on the layer surface 12, and the heater elements of the overhead heater 20 are controlled in response to compensate for such deviations.

Method of Thermal Vignetting Compensation

To correct the images taken by the thermal camera for thermal vignetting effects, the inventor has developed a method in which, in the first instance, a surface or body is kept at a steady state temperature and serves as a temperature reference. In the absence of any thermal vignetting effects, since the surface is at a steady state temperature throughout, the thermal camera should detect the same temperature throughout. However, if camera is subject to thermal vignetting distortion, the thermal profile of the resulting thermal images or constructed maps will be non-flat even though the temperature reference is at a uniform steady state temperature. The temperature reference 36 may for convenience be the heat source used to fuse or to preheat powder. The temperature reference 36 is configured to be moved through a plurality of positions along a first direction across the support and through the field of view of the thermal camera 70. The temperature reference herein represents a body that can be heated and maintained at a steady state temperature. The thermal camera 70 is provided above the support 18 for a layer over which a cross section of the object is to be formed, and comprises a plurality of sensor pixels $P_{i,j}$ configured to detect the temperature of the temperature reference 36. In a normal build process, the plurality of pixels $P_{i,j}$ may be used to monitor the temperature of the layer surface 12. Each pixel may thus be configured to detect the temperature of a corresponding region on the layer surface 12. Preferably, the plurality of pixels $P_{i,j}$ of the sensor are, between them, able to detect the entire layer surface 12 and provide an output to an associated controller 90, so that the temperature of the entire layer surface 12 is controllable to achieve good part quality anywhere within the build bed. The components of a powder bed fusion apparatus may be used in the following way to determine a correction matrix that corrects thermal images for vignetting distortion. First, the temperature reference 36 is caused to be at a first steady state temperature, for example by the controller 90, and maintained at the steady state temperature while the controller controls the movement of the temperature reference 36 at the first steady state temperature to move the temperature reference 36 through the field of view of the thermal camera 70 along a first direction. During the movement along the first direction, the controller controls the thermal camera 70 to record a plurality of thermal images. Each thermal image corresponds to one of the plurality of positions Xp and comprising the temperature of the temperature reference 36 as detected by at least one pixel of the plurality of sensor pixels $P_{i,j}$. Next, at least one pixel is identified, for example by the controller 90, that detected the temperature of the temperature reference 36 within a respective thermal image at the corresponding one of the plurality of positions Xp. From the identified pixels, a thermal map representing the detected temperature of the temperature reference at the plurality of positions along the first direction is constructed. In other words, a thermal map is constructed from the respective detected temperature of each of the identified pixels, the identified pixels corresponding to the plurality of positions. Finally, based on comparison between the thermal map and the first steady state temperature, a correction matrix for the identified pixels is generated. The correction matrix can then be applied to correct (or flatten) the temperatures detected by the identified pixels in subsequent measurements of the thermal camera. The controller may be configured to carry out all or some of the steps.

It is not necessary that the absolute temperature of the temperature reference 36 is known to provide a correction matrix, but merely that the reference surface over which calibration is performed is maintained at a uniform steady state temperature. Calibration of the temperature scale of the thermal camera 70 to an absolute temperature may be achieved in different ways and is not discussed here.

The detected temperatures of some or all of the plurality of pixels of the sensor may be affected by thermal vignetting distortion, and neighbouring pixels may be affected differently, so that an individual correction may be required for all pixels used to monitor the temperature of the layer surface. In other words, where a plurality of pixels are used to monitor the temperature of the layer surface 12, a corresponding per-pixel correction matrix may be required that can be applied to the plurality of pixels. The method may thus provide a correction matrix to correct (or flatten) the temperatures detected by all of the plurality of pixels in subsequent measurements of the thermal camera, as will be described in the following and as may be applied by the controller 90.

For practical reasons, the temperature reference 36 may present an elongate surface to cover a significant width, or all of the width, of the layer surface 12, such as would be provided by an infrared bar heater used for preheating the layer 12 or for fusing portions of the layer printed with absorber. The width of the layer surface 12 herein is referred to as the direction along y, perpendicular to the direction of movement of the carriages 30 along x as shown in FIG. 1. It is not necessary that the width of the layer surface 12 is shorter than its length; the expressions 'width' and 'length' are merely used to refer to the geometry of the components of the apparatus 1. The first direction may be perpendicular to the direction of elongation of the temperature reference 36, however this is not essential; instead, the direction of elongation may be non-parallel to the first direction.

To generate a measurement correction for pixels of the sensor along the first direction using a temperature reference 36 that does not cover the entire length of the layer, the temperature reference is moveable within the field of view of the plurality of pixels $P_{i,j}$ of the thermal camera sensor along a portion of the length, and preferably along the entire length, of the layer surface 12. The direction of motion of the temperature reference 36 in the following will be referred to as the 'first direction', parallel or antiparallel to x. A return stroke of the temperature reference (returning from one side of the layer surface, following its movement along the first direction, to the other side of the layer surface) may be referred to as occurring along a 'second direction opposite the first direction'.

Figure 2A:
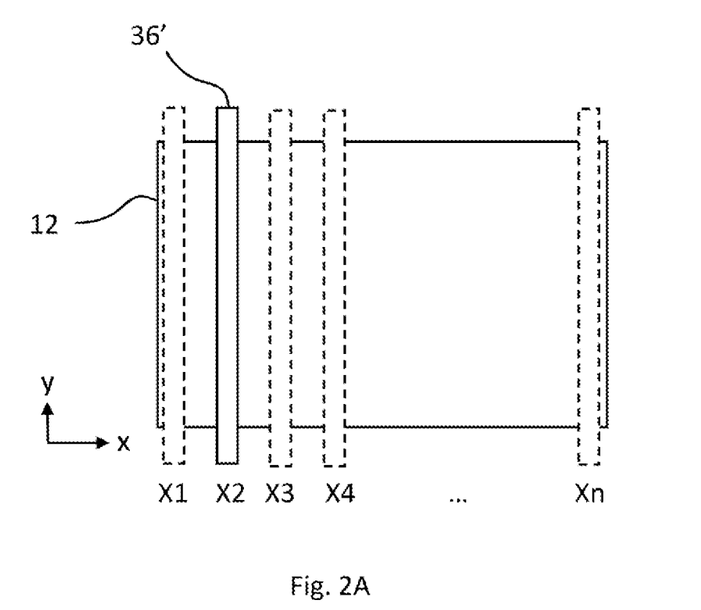
FIG. 2A is a schematic plan view of a layer below an elongate temperature reference as imaged by the thermal camera of FIG. 1 at a plurality of positions Xp.
Figure 2B:
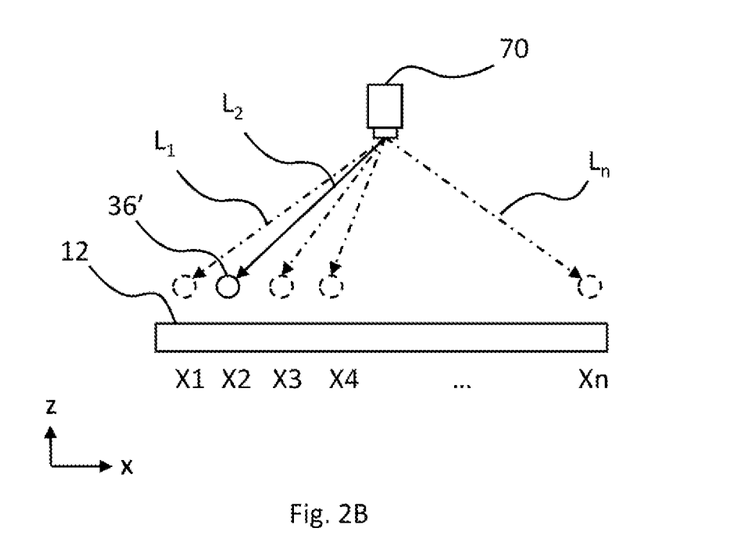
FIG. 2B is a schematic side view of FIG. 2A.

FIG. 2A is a plan view of the layer surface 12 over which the temperature reference 36, here by example in form of an elongate infrared heat source 36', is provided. As illustrated in FIG. 2B, the heat source 36' may remain in the line of sight Lp (p=1-n) of the thermal camera 70 for all positions Xp (p=1-n), although this is not strictly necessary. The heat source 36' is moveable along the first direction x over the layer surface 12 through the plurality of successive positions Xp, for example in one continuous movement, or in step wise movements. The plurality of positions Xp may be chosen to span the dimension of the layer surface 12 along the first direction (the length of the layer surface), such that the thermal map constructed represents the length of the layer surface 12.

Figure 3A:
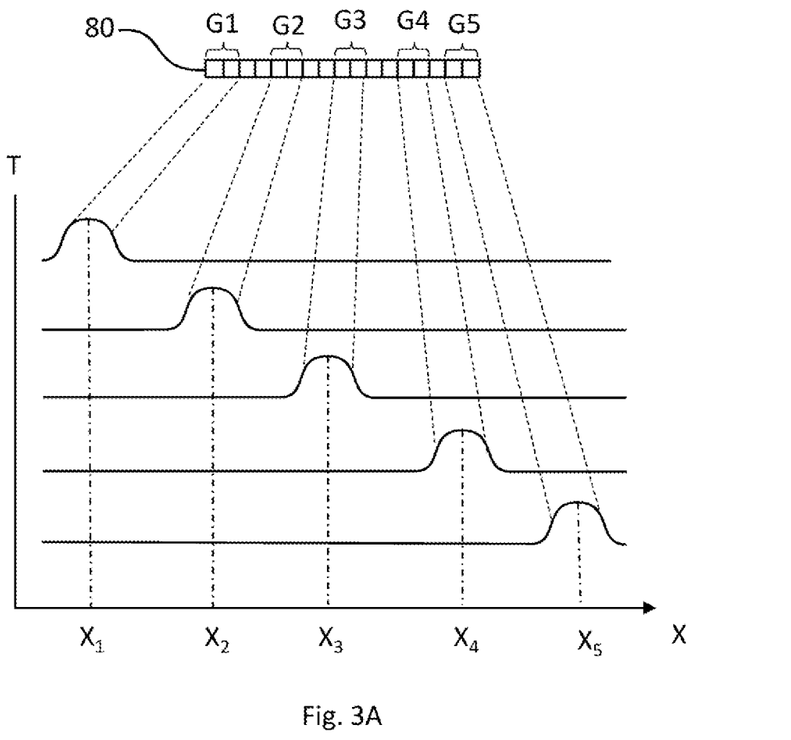
FIG. 3A schematically illustrates identified pixel groups that detected the temperature reference at a plurality of positions Xp.
Figure 3B:
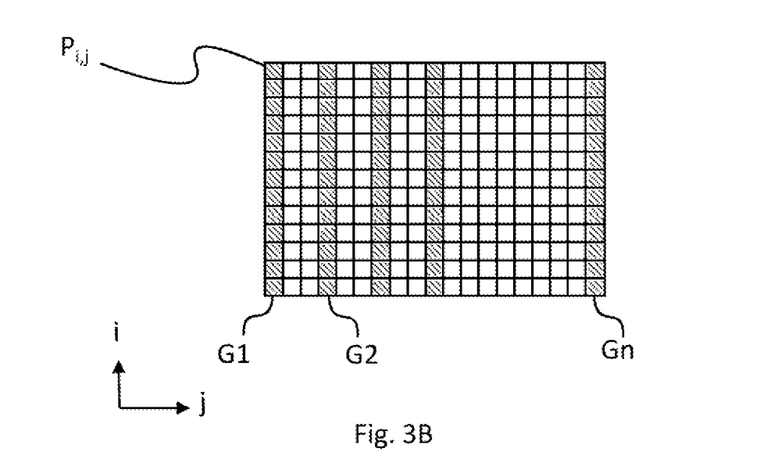
FIG. 3B schematically illustrates identified pixel groups in a two-dimensional representation of a constructed thermal map.

The steps of detecting the heat source 36' with identified pixel groups Gp of the thermal camera in FIG. 2B at a plurality of positions Xp is illustrated in FIGS. 3A and 3B. FIG. 3A shows a cross section through a sensor array 80 of the thermal camera, highlighting groups of pixels Gp that detected the heat source 36' at corresponding positions Xp along the first direction along x. The sensor 80 may be arranged in form of a two-dimensional rectangular array of rows i and columns j, defining the plurality of pixels Pi,j, and arranged such as to detect the temperature of the temperature reference along the entire width and length of the layer surface. For illustrative purposes, each position Xp of the heat source 36' corresponds to a pixel column $P_{i,Xp}$ that detected the temperature of the heat source.

For the group of pixels Gp, j may be parallel to the x-direction and i=constant for a rectangular array of rows i and columns j of sensor pixels. In addition, FIG. 3A schematically shows corresponding temperature measurements at each position Xp by the row of sensor pixels from a series of thermal images. In this example, for illustrative purposes only, each group G1 to G5 (shown in two dimensions only) comprises two pixels along the x-direction. For each thermal image acquired, the heat source 36' is at respective positions $X_1$ to $X_5$, and a corresponding group of pixels G1 to G5 detected the temperature of the heat source 36'. These will be the identified pixels used to construct the thermal map. The temperature of the heat source 36' is indicated by the increase in temperature along x. It should be noted that the temperature curves are offset along the vertical direction for clarity.

From a superposition of all curves, a temperature map may be obtained, as shown in two dimensions as corresponding constructed thermal map in FIG. 3B, highlighting the identified groups of pixels Pi,j used to construct the map. It should be noted that it is not essential that the array 80 is a rectangular array, or that the pixel group identified as having detected the temperature of the temperature reference is a column of pixels parallel to an edge of the array. The identified pixels may describe any suitable shape of a region within the sensor area.

Preferably, the plurality of positions Xp is such that the identified pixels, or groups of pixels Gp, represent the plurality of pixels Pi,j. For example, the controller 90 may be configured to determine a suitable set of thermal images comprised within a plurality of thermal images taken during the movement such that the identified groups of pixels represent the plurality of pixels. In this way, all pixels Pi,j of the sensor are corrected using the correction matrix. In addition, the plurality of positions Xp may be arranged such that the identified pixels, or groups of pixels Gp, are directly adjacent to one another along the first direction, for example by choosing a carriage speed appropriate for the sampling frequency of the thermal camera that allows respective identified pixel groups, which together representing all sensor pixels, to detect the temperature reference 36 at least in one of the thermal images. The controller 90 may be configured to move the temperature reference 36 (heat source 36') through the plurality of positions Xp distributed along the first direction. The controller 90 may further be configured to control the thermal camera 70 to acquire thermal images that detect the temperature of the elongate temperature reference 36 at the steady state temperature over the width of the layer surface 12. The controller 90 may be configured to synchronise the movement of the temperature reference 36 with the acquisition of the thermal images.

In addition, the temperature reference 36 (heat source 36') may span the width of the layer surface 12, for example by being elongate in a direction non-parallel to the first direction, and preferably in a direction substantially perpendicular to the first direction. The correction matrix may thus correspond to identified pixels detecting the width and length of the layer surface. In other words, the identified pixels may represent the entirety of the useable pixels of the sensor, and the resulting thermal map corresponds to detected temperatures detected by all of the useable pixels of the sensor. Useable pixels of the sensor may be those configured to detect the temperature of the layer surface at all locations. the plurality of pixels $P_{i,j}$ may comprise identified pixels, or groups of pixels, corresponding to the entire width and length of the layer surface 12. For the apparatus 1, this means that a single thermal map may be constructed in one pass of the heat source 36'.

Figure 4A:
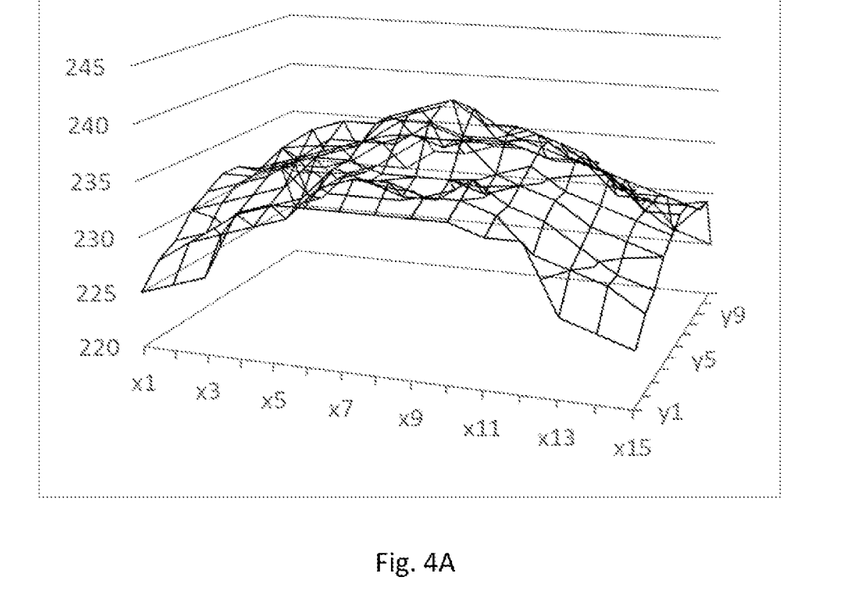
FIG. 4A is an example of an extrapolated three-dimensional thermal map generated according to an embodiment.

Turning next to FIG. 4A, a three-dimensional surface map of the detected temperatures of the identified groups of pixels Pi,j is shown, demonstrating typical vignetting distortion of a thermal camera with perceived depressed corners and a hotter centre. From comparing the surface map to the steady state temperature, a correction matrix can be generated, so that correction values may be defined that shift the detected temperatures of the respective identified pixels to the corrected temperature.

Figure 4B:
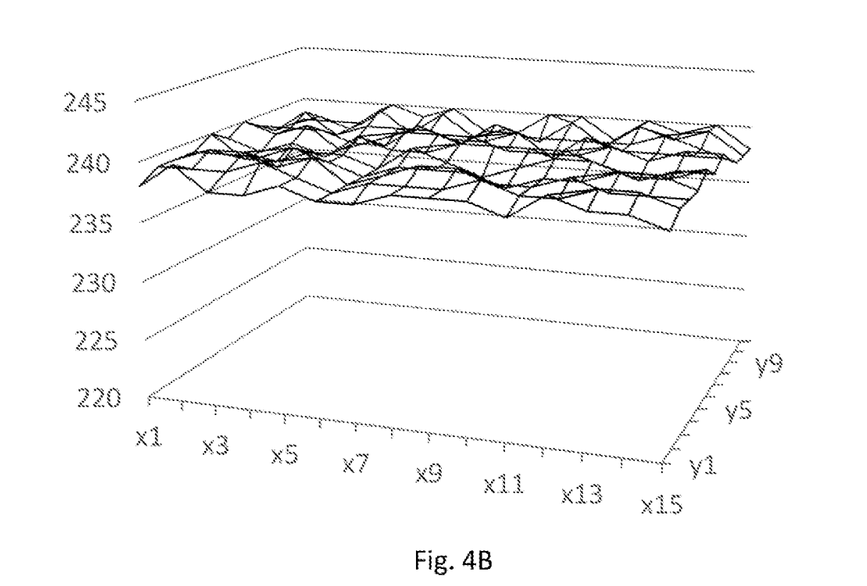
FIG. 4B illustrates the map of FIG. 4A after a correction matrix has been applied.

By applying the correction matrix to the thermal map of FIG. 4A, a corrected map is obtained as illustrated in FIG. 4B. The corrected map may for some pixels deviate slightly from the steady state temperature due to standard deviations in measurement. The vignetting effect has been substantially removed, resulting in a flattened map of detected temperatures. The correction matrix may be applied by the controller 90 to subsequent measurements of the thermal camera 70. This means that any subsequent measurements by the thermal camera 70 of actual temperature profiles on the build surface will be represented with improved accuracy.

The steps for the correction procedure will now be described with reference to the block diagram of FIGS. 5 to 7, and with reference to components of the apparatus illustrated in FIGS. 2A, 2B and to FIGS. 3A to 4B.

Steady State Temperature

Figure 5:
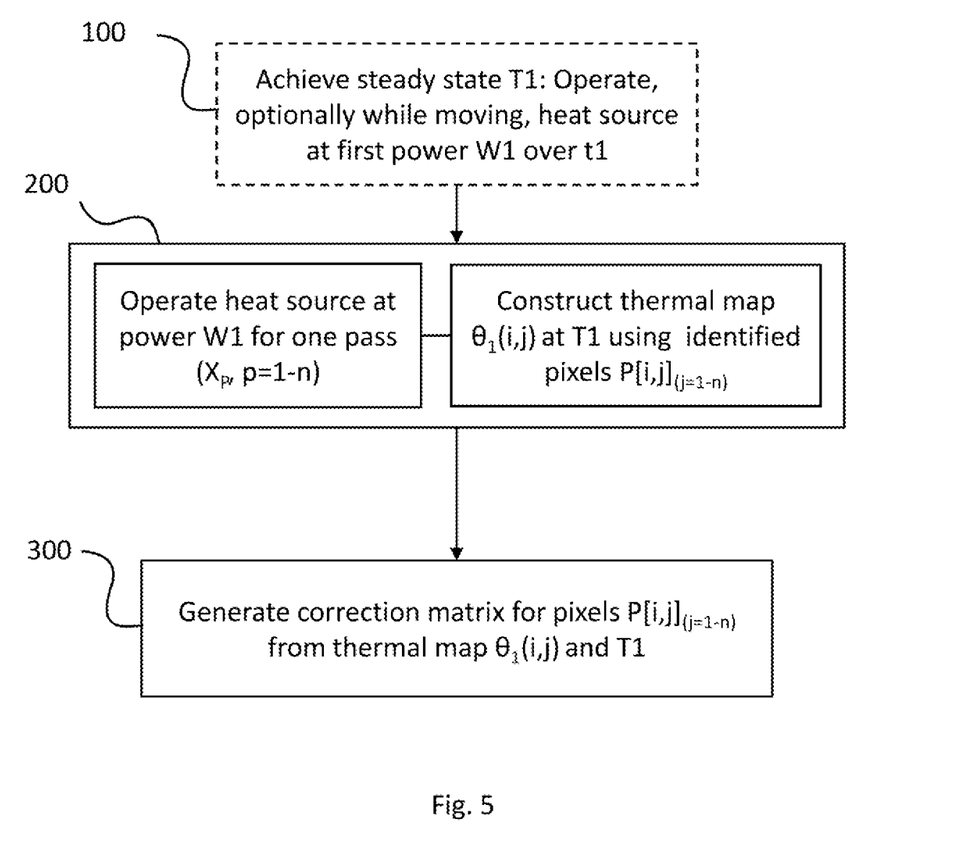
FIG. 5 is a block diagram according to an embodiment.

Turning first to FIG. 5, the procedure starts after block 100 where the temperature reference 36 is caused to be at a first steady state temperature. This may be achieved by addressing the temperature reference 36 directly or indirectly at a first input power W1 so that it heats up to the first steady state temperature T1. In one variant of the method, the temperature reference 36 may be moved, or passed, repeatedly through the field of view of the thermal camera, and/or over the layer surface of the apparatus over which a cross section of the object is to be formed, until the steady state temperature is achieved. The controller 90 may be configured to operate the temperature reference 36 for a time period t1 at the first power W1 to heat the temperature reference 36 to the first steady state temperature T1. By 'repeatedly passing' is meant to move the temperature reference 36 repeatedly back and forth, along the first direction and opposite the first direction.

The duration of the time period t1 may be determined dynamically, by monitoring the temperature of the temperature reference 36 by one or more pixels as the temperature reference 36 is repeatedly passed over the layer. Alternatively, the time period may be predefined for the required range of steady state temperatures so as to be sufficiently long to ensure the steady state temperature is achieved, and applied as a predefined time period t1 while applying the first input power W1. In addition, by repeatedly moving the temperature back and forth over the layer surface, a steady state condition of layer surface and of the space within the apparatus 1 may be achieved, and thus temperature fluctuations of the heat source reduced or prevented during the sampling procedure.

Once the controller has determined that the steady state temperature has been achieved; the controller is configured to progress the procedure to block 200.

Generating the Correction Matrix

At block 200, the temperature reference 36 is moved through the field of view of a thermal camera and along the first direction through a plurality of positions across the layer surface 12 while being maintained at the first steady state temperature T1. At the same time, the thermal camera 70 is used to record a plurality of thermal images, each thermal image corresponding to one of the plurality of positions Xp and comprising the temperature of the temperature reference 36 as detected by at least one pixel of the plurality of sensor pixels. At block 300, a correction matrix for at least the identified pixels is generated from comparing the thermal map $\theta_1(i,j)$ generated in block 200 to the steady state temperature T1.

The controller 90 may be configured to control the motion of the temperature reference, for example by controlling the motion of the carriage to which the temperature reference may be mounted. The thermal images may be generated during a continuous or step wise movement of the temperature reference along the first direction. Where the temperature reference 36 is moved in one continuous movement, the controller 90 may be configured to determine a set of thermal images comprised within the plurality of thermal images such that the identified groups of pixels represent the plurality of pixels. Turning to FIG. 6, for a step-wise movement instead, the temperature reference is be moved to successive and discrete ones of the plurality of positions Xp along the first direction, as indicated at block 210m. While being stationary at each of the positions, and while being maintained at the steady state temperature at block 220m, e.g. by being operated at the first power W1, the thermal camera 70 is controlled at block 240m to generate a thermal image at each position Xp using at least one respective pixel $P_{i,p}$ of the plurality of pixels $P_{i,j}$. Blocks 210m to 240m are repeated until all positions Xp of the plurality of positions have been imaged. The block diagram of FIG. 6 broadly also applies to a continuous motion of the temperature reference, where the positions Xp are determined by the sample rate of the thermal camera: each instance a thermal image is generated, it corresponds to a certain position Xp of the temperature reference.

Next, from the thermal images, at least one pixel or a pixel group that detected the temperature of the temperature reference 36 within a respective thermal image at the corresponding one of the plurality of positions Xp is identified, and at block 260, from the identified pixels or groups of pixels that detected the temperature of the temperature reference 36 at the plurality of positions Xp, a thermal map $\theta_m(i,j)$ is constructed. These steps may be controlled by the controller 90. An identified group of pixels Pi,j may detect the temperature of the temperature reference 36 in a respective thermal image that corresponds to one of the plurality of positions Xp along the first direction, where each group extends over more than one pixel, for example along the j-direction, such that the thermal map is constructed from the identified groups of pixels in block 260.

With reference to FIG. 3B, a group of pixels Gp may represent positions i,j within a two-dimensional sensor array 80 and m indicates the steady state temperature Tm by heating the temperature reference at power Wm, for example m=1 for example the first steady state temperature T1 using first power W1. Constructing the thermal map $\theta_m(i,j)$ may comprise stitching together the areas of the image corresponding to the identified (and distinct) pixels, or distinct groups of pixels. From comparing the thermal map to the first steady state temperature, a correction matrix is generated for each identified pixel at block 300.

Extrapolation

As described earlier, the plurality of positions Xp may be such that the identified groups Gp of the plurality of pixels represent the plurality of pixels of the sensor. Instead, the positions Xp may be such that gaps exist between some or each adjacent position of the elongate temperature reference, each gap corresponding to a respective non-contributing pixel group located between the contributing (identified) pixel groups.

In the specific example of FIG. 3A, measurement gaps are indicated between the groups of pixels Gp that detected the temperature of the temperature reference 36 (heat source 36'). This results in missing data in the thermal map illustrated in FIG. 3B, where data gaps exist for non-contributing pixels (white background) between data bands (dark background) from identified pixel groups Gp. Missing data may for example occur if the speed of the temperature reference is too fast compared to the sampling frequency of the sensor, or if any obstruction exists at locations between the temperature reference and the sensor.

Figure 6:
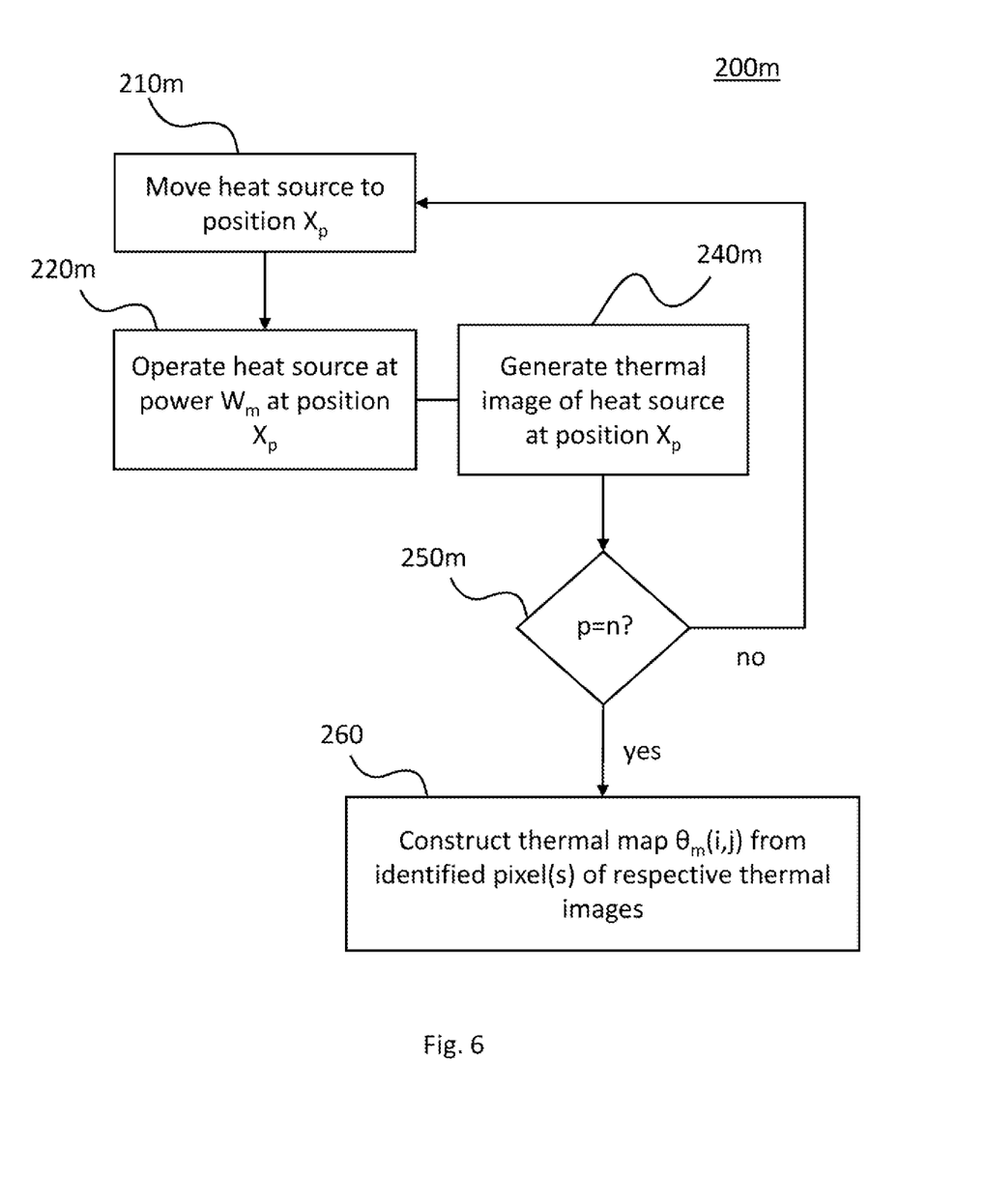
FIG. 6 is a block diagram with further detail of block 200 of FIG. 5.

In this case, the identified pixels or the groups of pixels are a subset of the plurality of pixels, and the method illustrated at block 260 of FIG. 6 may further comprise, and the controller 90 may be configured to carry out the step of extrapolating the detected temperatures between the identified pixels, or groups of pixels, so as to fill in the data gaps due to the non-contributing pixels, and such that the correction matrix is generated for the plurality of pixels of the sensor 80. The resulting thermal map thus may comprise an extrapolation of temperatures between the subset of contributing (identified) pixel columns, such that the correction matrix provides a correction for all pixels of the sensor, i.e. for contributing and non-contributing pixel columns, of the sensor. This is illustrated in the corresponding three-dimensional map of FIG. 4A.

Alternatively, the correction matrix may be extrapolated to provide a correction for each pixel of the sensor.

Further Steady State Temperatures, Correction Function

Figure 7:
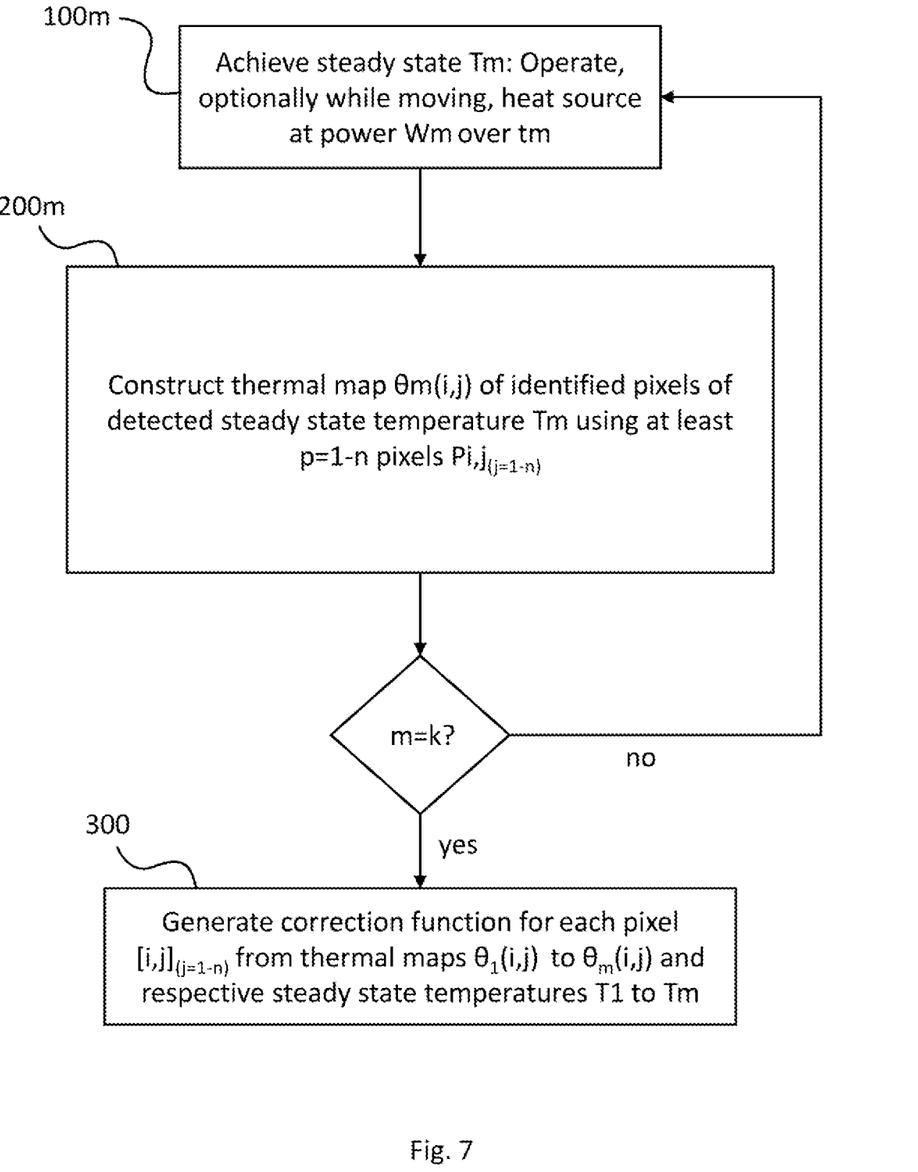
FIG. 7 is a block diagram illustrating a variant of the methods of FIGS. 5 and 6.

In order to reliably correct for thermal vignetting distortion over a range of detected temperatures Tm, the method may be repeated at one or more further steady state temperatures, as illustrated in FIG. 7, which is a block diagram illustrating a loop for blocks 100 and 200 of FIG. 5. Block 100 is repeated for a number m (m=1 to k) of a first and one or more further steady state temperatures Tm, as indicated by block 100m. The temperature reference is directly or indirectly heated at a power input Wm for a time period tm.

At block 200m, for each steady state temperature Tm generated at block 100m, a thermal map θm(i,j) is generated. The pixel or groups of pixels Pi,j identified to construct the thermal maps θm(i,j) along the first direction may correspond to the same plurality of positions for each steady state temperature, and/or may be the same or different respective pixels or groups of pixels Pi,j identified to construct each thermal map θm(i,j) along the first direction for a given position Xp. Alternatively, the plurality of positions Xp may be different for some or all steady state temperatures in blocks 200m.

Once all thermal maps θm(i,j) have been constructed (optionally applying an extrapolation between identified pixel groups for each, as necessary), a correction function is generated for each pixel of the sensor. Thus, the steps may further comprise, and the controller 90 may be configured to carry out the steps of, determining the relationship of temperature behaviour per pixel of the identified pixels, or groups of pixels, from the thermal maps θm(i,j) and respective steady state temperatures Tm; generating a temperature correction function for each pixel based on the determined relationship; and generating the correction matrix from the temperature correction function for each pixel for the respective detected temperature of the pixel.

Thus, from calculating a correction function, a correction can be applied over a continuous temperature range to the detected temperature of each pixel to subsequent measurements by the thermal camera 70.

Figure 8A:
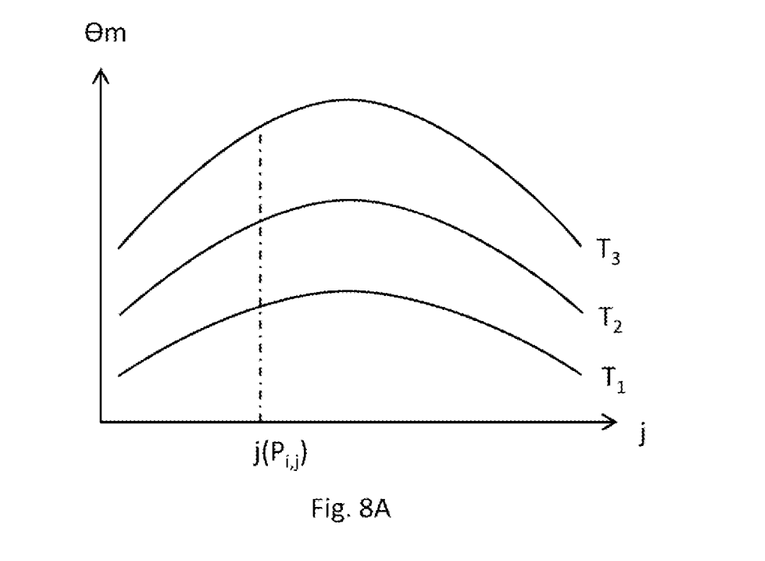
FIG. 8A is a schematic representation of two-dimensional profiles through constructed thermal maps for different steady state temperatures.
Figure 8B:
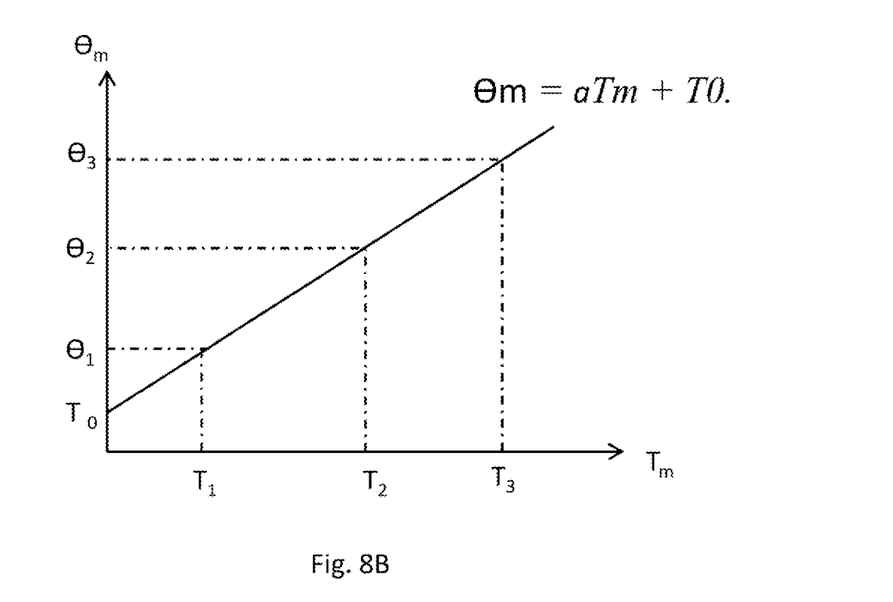
FIG. 8B illustrates a correction function determined from the data in FIG. 8A.

This correction function may be a function that varies linearly with temperature. It may further comprise applying a constant offset of the temperature readings of the sensor. FIG. 8A illustrates a series of two-dimensional slices through three thermal maps corresponding to three steady state temperatures $T_1$, $T_2$ and T3. The slices are taken for example through the mid point along i and along the direction j of the array of pixels. As can be seen, the vignetting distortion is most pronounced at the highest temperature $T_3$. For a specific pixel Pi,j, indicated at j(Pi, j) along the j-direction, the detected temperature Om against the steady state temperature Tm is plotted in FIG. 8B. A fit to the graph produces a function of detected temperature that varies linearly with steady state temperature at a rate a and with an offset T0 of temperature of the pixel: $θm=aT_m+T0$. For this specific pixel, a correction function may be defined from the fitted equation. A similar approach for a different pixel along the first direction will result in a different function, such that for each pixel an individual correction function may be defined, resulting in a matrix of correction functions.

Further data manipulation methods may be applied to the thermal images, thermal maps or the correction matrix described herein, for example filtering or smoothing of the raw or constructed data, or averaging between the detected temperature of two or more neighbouring pixels.

GENERAL CONSIDERATIONS

The correction method may be carried out in-situ of the apparatus, for example after the installation of a thermal camera in a specific apparatus, or in a subsequent build process to take into account any subsequent camera misalignment due to servicing for example.

The controller of the apparatus may in variants of the method provide the thermal images to an external processor for analysis and receive the correction matrix from the external processor to apply to subsequent measurements of the thermal camera. The external processor may identify at least one pixel that detected the temperature of the temperature reference within a respective thermal image at the corresponding one of the plurality of positions, construct a thermal map from the identified pixels representing the detected temperature of the temperature reference at the plurality of positions; and generate the correction matrix for the identified pixels based on comparison between the thermal map and the first steady state temperature, and provide the correction matrix to the controller of the apparatus.

Figure 9A:
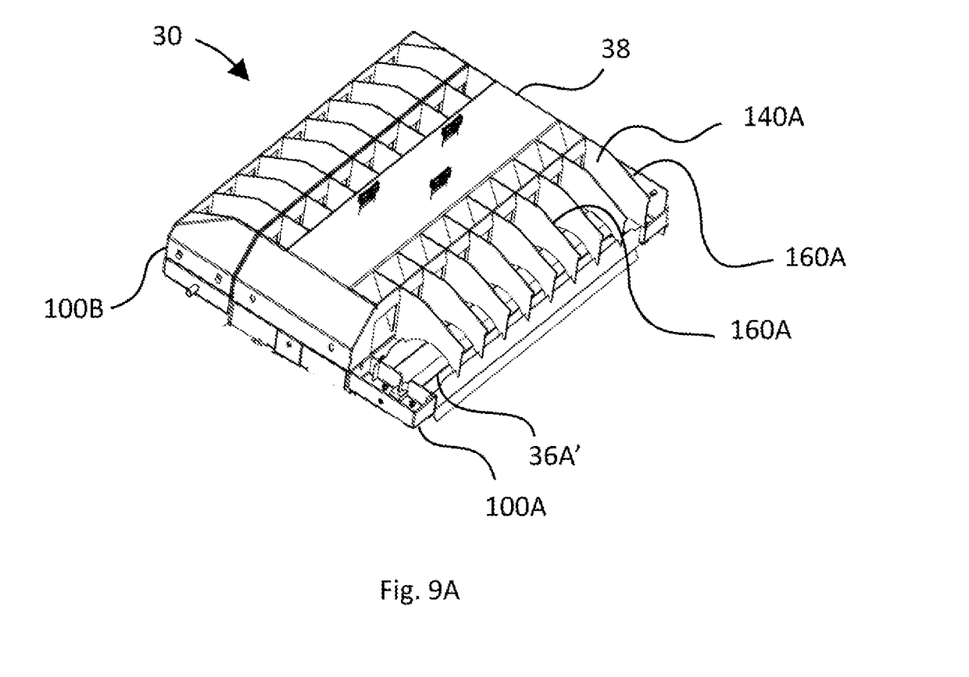
FIG. 9A is a schematic three-dimensional illustration of a carriage comprising two temperature references largely unobscured when viewed from above.
Figure 9B:
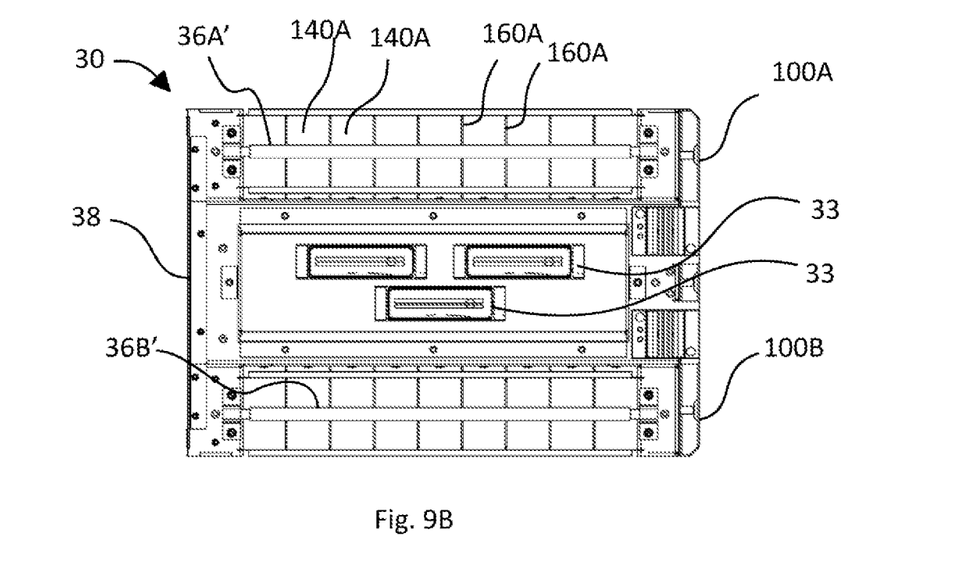
FIG. 9B is a schematic plan view from underneath the carriage of FIG. 9A.

In some apparatus, the temperature reference 36 may be in the direct line of sight of the thermal camera 70 at all times during its pass over the build bed surface 12. Where the temperature reference 36 is provided in form of an infrared heat source 36' mounted on a movable carriage 30 for example, the housing of the heat source 36' may be arranged such that heat can freely radiate upwards, i.e. there is no or little obstruction between the heat source 36' and the infrared camera. An example of such a housing is illustrated in FIGS. 9A and 9B. FIG. 9A is a three-dimensional representation of a carriage 30 comprising a printing module 38, and FIG. 9B is a view of the underside of the carriage, looking up towards the printheads 33 from the powder layer. Elongate infrared heat sources 36A' and 36B' are provided to either side of the printing module 38. The arrangement of the respective housings 100A and 100B of the heat sources 36A', 36B' allows the temperature reference 36 of a powder bed fusion type apparatus 1 in FIG. 1 to be in the direct line of sight over substantially its entire length during a pass along the first direction. This is analogous to the illustration of FIGS. 2A and 2B. Here the housing also provides vertical guards 160A that protect a user from touching the heat source during servicing or from directly viewing it during a build process. The guards are separated by spaces 140A that allow direct line of sight of the heat source by the camera. Thus the infrared camera can image the elongate heat source at substantially all positions over the layer surface 12. In other variants of the carriage, for example where the heat source is positioned inside a downward reflector and thus shielded from the direct line of slight of the camera, the cover of the heat source may need to be removed by the operator before initiating the correction routine. It is not necessary that the temperature reference is visible along substantially its entire length. In variants of the apparatus, the temperature reference may be in direct line of sight of the thermal camera along at least a majority of its length. Any missing temperature data may be filled in by extrapolation.

As an alternative to the elongate heat source 36' used as the temperature reference 36, the elongate temperature reference may instead be provided in form of an elongate thermally conductive strip provided to a carriage 30, and the controller 90 may be configured to move the carriage back and forth so as to move the thermally conductive strip through the field of view of the thermal camera 70. Optionally, the first direction may be perpendicular to the direction of elongation of the thermally conductive strip. The thermally conductive strip may be heated to the steady state temperature Tm from within the carriage by, for example, one or more thermal resistors provided below the thermally conductive strip, with respect to the thermal camera 70. The controller 90 may be configured to operate the one or more resistors at a power Wm such that the resistors heat the thermally conductive strip to the steady state temperature Tm. Alternatively, the elongate thermally conductive strip may be arranged, with respect to the thermal camera 70, above and substantially parallel to one of the elongate infrared heat sources of the apparatus 1, and the controller may be configured to operate the heat source at a first or further power Wm to cause the thermally conductive strip to be at the respective first or further steady state temperatures Tm. For example, the thermally conductive strip may be integrated into the roof of a housing for the elongate heat source, and heated by the heat of the heat source when the heat source is operated at a power W. Such an arrangement may be advantageous where the elongate heat source is not in the direct line of sight of the thermal camera, or where the heat source comprises a series of discrete filaments and thus does not present a uniform temperature along its direction of elongation. While such effects may be compensated for digitally, for example at block 240 or 260, the thermally conductive strip heated by the elongated heat source will reduce such temperature variations along the direction of elongation of the strip.

In variants of the above methods using an elongate temperature reference 36, it may be beneficial in block 200, after carrying out blocks 220 and 240 of operating and imaging the elongate temperature reference along the first direction at positions Xp, to repeat blocks 220 and 240 at the first steady state temperature by either:

moving the or a further elongate temperature reference along a second direction perpendicular to the first direction, while maintaining the elongate temperature reference at the first steady state temperature; or rotating the sensor of the camera by 90° such that the original x-direction is now the y-direction, and repeating blocks 220 and 240 along the first direction while maintaining the elongate temperature reference at the first steady state temperature.

In this way, for each steady state temperature, two thermal maps are obtained in block 260 which may be used to compensate for temperature variation effects along the direction of elongation of the temperature reference. For example, where the temperature reference 36 is heated by a series of filaments or resistors that lead to temperature variation along the direction of elongation, such variations may be evened out by carrying out the method along two non-parallel directions of the plurality of sensor pixels of the array 80. Alternatively, the temperature profile along the direction of elongation may be smoothed before a correction matrix is determined.

It will be understood that the steady state temperature is chosen so as to provide sufficient contrast for the thermal sensor pixels to identify the temperature reference 36 against the background temperature of each thermal image. For a 3 kW infrared bar heater for example, the steady state temperate may be achieved by relatively low duty operation of 0.05% to 1.25%, leading to about 75° C. to 200° C. of steady state temperature of the back of the heat source as detected by the thermal camera. In addition, a low velocity of movement is preferred to avoid cooling effects due to movement, for example velocities of 5 mm/sec.

The invention claimed is:

1. A method for correcting thermal image distortion in a thermal camera in an apparatus for the layer-by-layer manufacture of three-dimensional objects, the thermal camera comprising a plurality of sensor pixels arranged along a first direction;

the method comprising the steps of:
(a) causing a temperature reference to be at a first steady state temperature;
(b) moving the temperature reference at the first steady state temperature through a plurality of positions along the first direction through the field of view of the thermal camera;
(c) recording a plurality of thermal images with the thermal camera while moving the temperature reference during step (b), each thermal image corresponding to one of the plurality of positions and comprising the detected temperature of the temperature reference as detected by at least one pixel of the plurality of sensor pixels;
(d) identifying the at least one pixel that detected the temperature of the temperature reference within a respective thermal image at the corresponding one of the plurality of positions;
(e) constructing a thermal map from the identified pixels representing the detected temperature of the temperature reference at the plurality of positions;
(f) generating a correction matrix for the identified pixels based on comparison between the thermal map and the first steady state temperature; and
(g) applying the correction matrix to subsequent measurements of the thermal camera.

2. The method of claim 1, wherein the at least one pixel comprises a group of pixels and step (d) comprises identifying at each position from the respective thermal image a group of pixels of the plurality of pixels that detected the temperature of the temperature reference; constructing the thermal map from the identified groups of pixels in step (e); and generating the correction matrix for the identified groups of pixels in step (f).

3. The method of claim 1, wherein the plurality of positions is chosen such that the identified pixels or groups of pixels represent the plurality of pixels.

4. The method of claim 1, wherein the identified pixels or the groups of pixels are a subset of the plurality of pixels, the method further comprising extrapolating the detected temperatures between identified pixels, or groups of pixels, so as to generate a correction matrix for the plurality of pixels of the sensor.

5. The method of claim 1, wherein steps (a) to (e) are repeated for one or more further steady state temperatures of the temperature reference, and wherein step (f) comprises:
determining the relationship of temperature behaviour per pixel of the identified pixels, or groups of pixels, from the thermal maps and respective steady state temperatures;
generating a temperature correction function for each pixel based on the determined relationship; and
generating the correction matrix from the temperature correction function for each pixel for the respective detected temperature of the pixel.

6. The method of claim 1, wherein step (a) comprises repeatedly moving the temperature reference through the field of view of the thermal camera, and/or over the layer surface of the apparatus over which a cross section of the object is to be formed, until the steady state temperature is achieved.

7. The method of claim 1, wherein the temperature reference is an elongate infrared heat source in direct line of sight of the thermal camera, and wherein step (a) comprises operating the heat source at a first, or further, power until the heat source reaches the first, or the further, steady state temperature.

8. The method of claim 1, further comprising one or more of the following:
smoothing the constructed thermal image;
smoothing the correction matrix before applying the correction matrix to subsequent measurements of the thermal camera.

9. The method of claim 1, further comprising:
repeating steps (a) to (d) for one or more further steady state temperatures of the temperature reference;
constructing further thermal maps from the identified pixels or groups of pixels representing the one or more further detected temperatures of the temperature reference along the plurality of positions in the first direction;
determining the relationship of temperature behaviour per pixel of the identified pixels, or groups of pixels, from the thermal maps and the respective steady state temperatures;

generating a temperature correction function for each pixel based on the determined relationship; and
generating the correction matrix from the temperature correction function for each pixel.

10. A controller for correcting thermal image distortion of a thermal camera in an apparatus for the layer-by-layer manufacture of three-dimensional objects, the thermal camera comprising a plurality of sensor pixels arranged along a first direction, wherein the controller is configured to:
  (a) cause a temperature reference to be at a first steady state temperature;
  (b) control movement of the temperature reference at the first steady state temperature to move the temperature reference through a plurality of positions along the first direction through the field of view of the thermal camera;
  (c) control the thermal camera during step (b) to record a plurality of thermal images, each thermal image corresponding to one of the plurality of positions and comprising the detected temperature of the temperature reference as detected by at least one pixel of the plurality of pixels;
  (d) identify the at least one pixel that detected the temperature of the temperature reference within the respective thermal image at the corresponding one of the plurality of positions within the image;
  (e) construct a thermal map from the identified pixels representing the detected temperature of the temperature reference at the plurality of positions;
  (f) generate a correction matrix for the identified pixels based on a comparison between the thermal map and the first steady state temperature; and
  (g) apply the correction matrix to subsequent measurements of the thermal camera.

11. An apparatus for the layer-by-layer formation of a three-dimensional object from particulate material, the apparatus comprising:
  a thermal camera provided above a support for a layer over which a cross section of the object is to be formed, the thermal camera comprising a plurality of sensor pixels arranged along a first direction and configured to monitor the temperature of the layer surface;
  a temperature reference moveable through a plurality of positions along the first direction across the support and through the field of view of the thermal camera,
  wherein the thermal camera is further configured to detect the temperature of the temperature reference; and
  a controller configured to:
  (a) cause a temperature reference to be at a first steady state temperature;
  (b) control the movement of the temperature reference at the first steady state temperature so as to move the temperature reference through a plurality of positions along the first direction through the field of view of the thermal camera;
  (c) control the thermal camera during step (b) to record a plurality of thermal images, each thermal image corresponding to one of the plurality of positions and comprising the detected temperature of the temperature reference as detected by at least one pixel of the plurality of sensor pixels;
  (d) identify at least one pixel that detected the temperature of the temperature reference within a respective thermal image at the corresponding one of the plurality of positions;
  (e) construct a thermal map from the identified pixels representing the detected temperature of the temperature reference at the plurality of positions;
  (f) generate a correction matrix for the identified pixels based on comparison between the thermal map and the first steady state temperature; and
  (g) apply the correction matrix to subsequent measurements of the thermal camera.

12. The apparatus of claim 11, wherein the at least one pixel comprises a group of pixels and the controller is configured to identify a respective group of the plurality of pixels that detected the temperature of the temperature reference at each of the plurality of locations, and wherein the thermal map is constructed from the identified groups of pixels in step (d).

13. The apparatus of claim 12, wherein the temperature reference is elongate in a length direction non-parallel to the first direction so that the temperature reference spans at least a portion of a width of the layer surface, the layer width being along a direction substantially perpendicular to the first direction; wherein the temperature reference is in direct line of sight of the thermal camera along a majority of its length; and wherein the group of pixels identified in step (d) is configured to detect the temperature of the elongate temperature reference along the direction of elongation.

14. The apparatus of claim 12, wherein the plurality of positions are arranged such that the identified groups of pixels are directly adjacent to one another along the first direction.

15. The apparatus of claim 11, wherein the elongate temperature reference is an elongate infrared heat source; and wherein the controller is configured to operate the heat source at a first power to heat the heat source to the first steady state temperature.

16. The apparatus of claim 11, wherein the elongate temperature reference comprises an elongate thermally conductive strip provided to a carriage, and the controller is configured to move the carriage back and forth so as to move the thermally conductive strip through the field of view of the thermal camera, and optionally wherein the first direction is perpendicular to the direction of elongation.

17. The apparatus of claim 16, wherein the thermally conductive strip is heated to the first steady state temperature by one of:
  one or more resistors provided below the thermally conductive strip, with respect to the thermal camera, wherein the controller is further configured to operate the one or more resistors such that the resistors heat the thermally conductive strip to the first steady state temperature; or
  an elongate infrared heat source arranged to heat the layer surface, wherein the thermally conductive strip is arranged, with respect to the thermal camera, above and substantially parallel to the elongate infrared heat source; and wherein the controller is configured to operate the heat source at a first power to conduct heat to the thermally conductive strip and cause it to be at the respective first steady state temperature.

18. The apparatus of claim 11, wherein the controller is further configured to:
  identify a group of pixels of the plurality of pixels that detected the temperature of the temperature reference in a respective thermal image at the corresponding one of the plurality of positions in step (d);
  construct the thermal map of the temperature reference at the plurality of positions along the first direction from the identified groups of pixels in step (e); and generate the correction matrix for the identified groups of pixels based on comparison of the thermal map against the first steady state temperature.

19. The apparatus of claim 11, wherein the temperature reference is elongate in a direction non-parallel to the first direction and is arranged to span the width of the layer surface, wherein the width is perpendicular to the first direction, and wherein in step (b), the controller is configured to:
   move the elongate temperature reference through the plurality of positions distributed along the first direction, the plurality of positions being distributed along the length of a layer surface of the apparatus over which the object is to be formed, wherein the layer length is parallel to the first direction; and
   control the thermal camera to acquire thermal images that detect the temperature of the elongate temperature reference over the width of the layer surface; such that the correction matrix constructed in step (e) corresponds to the identified pixels detecting the width and length of the layer surface.

20. The apparatus of claim 11, wherein the controller is further configured to:
   repeat steps (a) to (d) for one or more further steady state temperatures of the temperature reference;
   construct further thermal maps from the identified pixels or groups of pixels representing the one or more further detected temperatures of the temperature reference along the plurality of positions in the first direction;
   determine the relationship of temperature behaviour per pixel of the identified pixels, or groups of pixels, from the thermal maps and the respective steady state temperatures;
   generate a temperature correction function for each pixel based on the determined relationship; and
   generate the correction matrix from the temperature correction function for each pixel.

* * * * *